United States Patent [19]

Maurer

[11] 4,212,660
[45] Jul. 15, 1980

[54] METHOD FOR MAKING MULTIPLE MODE WAVEGUIDE HAVING CYLINDRICAL PERTURBATIONS

[75] Inventor: Robert D. Maurer, Painted Post, N.Y.

[73] Assignee: Corning Glass Works, Corning, N.Y.

[21] Appl. No.: 22,890

[22] Filed: Mar. 22, 1979

Related U.S. Application Data

[62] Division of Ser. No. 824,152, Aug. 12, 1977.

[51] Int. Cl.² .................. C03C 25/02; C03D 37/02
[52] U.S. Cl. .................................. 65/3 A; 65/4 B; 350/96.19; 350/96.29; 350/96.31
[58] Field of Search ............... 65/3 A, 4 B; 350/96.15, 350/96.29, 96.31, 96.19

[56] References Cited

U.S. PATENT DOCUMENTS

| | | | |
|---|---|---|---|
| 3,615,312 | 10/1971 | Landry | 65/4 B |
| 3,666,348 | 5/1972 | Marcatili | 65/3 A X |
| 3,687,514 | 8/1973 | Miller | 350/96.15 |
| 3,711,262 | 1/1973 | Keck et al. | 65/3 A |
| 3,737,293 | 6/1973 | Murer | 65/3 A |
| 3,823,995 | 7/1974 | Carpenter | 359/96.31 |
| 3,891,302 | 6/1975 | Dabby et al. | 350/96.19 |
| 3,909,110 | 9/1975 | Marcuse | 350/96.15 |
| 4,049,413 | 9/1977 | French | 65/3 A |
| 4,053,204 | 10/1977 | Miller | 350/96.31 |
| 4,053,205 | 10/1977 | Miller | 350/96.31 |

FOREIGN PATENT DOCUMENTS 1396433  6/1975  United Kingdom .................. 350/96.29

OTHER PUBLICATIONS

Fourth European Conference on Optical Communication; "Dispersion Measurement of CVD-Fabricated Fibers with a Finite Number of Layers" Behm 9/12-15/1978.

"Mode Mixing with Reduced Losses in Parabolic Index Fibers" Bell System Tech. Journal vol. 55#6 Jul.-Aug., 1976 pp. 777-802 Marcuse.

*Primary Examiner*—Robert L. Lindsay, Jr.
*Attorney, Agent, or Firm*—Walter S. Zebrowski; Clarence R. Patty, Jr.; Richard E. Kurtz

[57] ABSTRACT

A multiple mode optical waveguide includes a glass core and a glass cladding around the core. In order to promote coupling between guided modes of light propagation, the core has cylindrical perturbations spaced along its length. The perturbations include index of refraction variations in rings within the core.

3 Claims, 10 Drawing Figures

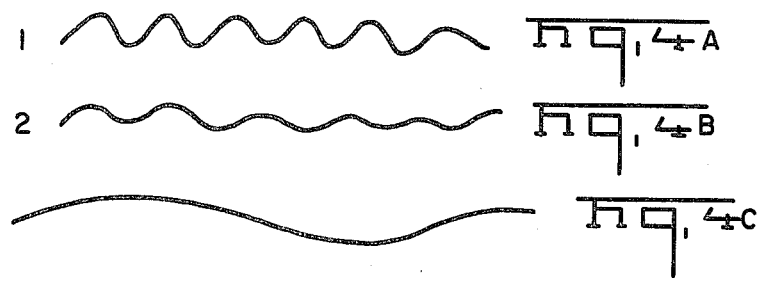
Fig. 4-A
Fig. 4-B
Fig. 4-C
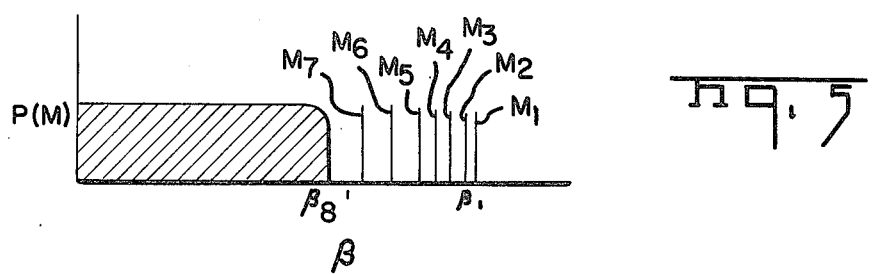
Fig. 5
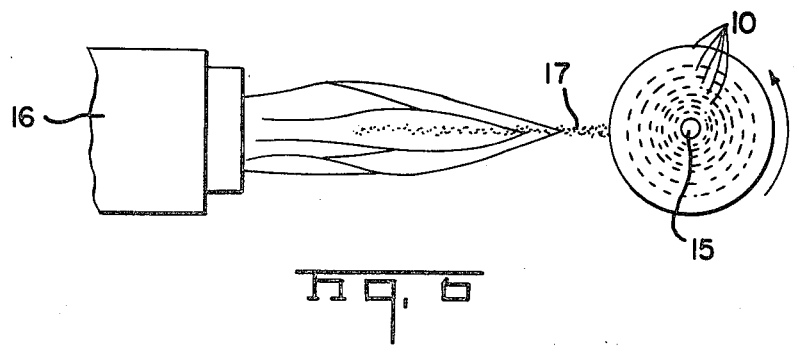
Fig. 6

METHOD FOR MAKING MULTIPLE MODE WAVEGUIDE HAVING CYLINDRICAL PERTURBATIONS

This is a division of application Ser. No. 824,152, filed Aug. 12, 1977.

BACKGROUND OF THE INVENTION

This invention relates to multiple mode waveguides and methods of making them.

The continually increasing amount of traffic that communications systems are required to handle has forced the development of high capacity systems. Even with the increased capacity made available by systems operating between $10^9$ Hz and $10^{12}$ Hz, traffic growth is so rapid that saturation of such systems is anticipated in the very near future. Higher capacity communication systems operating around $10^{15}$ Hz are needed to accommodate future increases in traffic. These systems are referred to as optical communication systems since $10^{15}$ Hz is within the frequency spectrum of light. Conventional electrically conductive waveguides which have been employed at frequencies between $10^9$ and $10^{12}$ Hz are not satisfactory for transmitting information at frequencies around $10^{15}$ Hz.

The transmitting media required in the transmission of frequencies around $10^{15}$ Hz are hereinafter referred to as "optical waveguides".

U.S. Pat. Nos. 3,711,262—Keck and Schultz; 3,823,995—Carpenter; and 3,737,293—Maurer disclose methods of making optical waveguides.

Light propagates through optical waveguides in one or more transmission modes depending upon the radius, relative indices of refraction of cores and cladding and the wavelength of the light. Generally, it is desirable to limit propagation to one particular mode. However, this requires the use of an extremely small diameter waveguide. It is desirable to use a larger diameter waveguide in order to more easily apply light thereto and to connect sections of wave guide. Larger diameter waveguide will sustain propagation in more than one mode.

"THEORY OF DIELECTRIC OPTICAL WAVEGUIDES" by Marcuse, Academic Press, New York and London, 1974 describes the theory of mode coupling. U.S. Pat. Nos. 3,666,348—Marcatilli and 3,687,514—Miller et al discuss increasing the band pass of an optical waveguide through mode coupling. Whereas individual uncoupled modes have a large group velocity dispersion, coupling locks the energy flow of these modes together and decreases pulse spreading.

Mode coupling can be explained in several ways, one of which is set forth in the aforementioned Miller et al patent. Another simplified explanation of mode coupling is that the photons of light jump back and forth between the different modes which are coupled. Each mode has a characteristic velocity of propagation. Photons which jump back and forth between two modes arrive at the end of the waveguide with a characteristic velocity which is an average of the propagation velocities of the two modes in which they traveled.

The aforementioned Marcatilli and Miller et al patents disclose the use of diameter and axis perturbations to achieve mode coupling. Bumps on the core-cladding interface or bubbles in the waveguide are also perturbations which cause mode coupling. Manufacturing control of these perturbations to obtain the desired coupling properties is difficult.

The paper entitled "MODE COUPLING IN GRADED-INDEX FIBERS" which was presented at the Symposium on Optical and Acoustical Micro-Electronics, Polytechnical Institute of New York, Apr. 16–18, 1974, Robert Olshansky and application Ser. No. 725,172 Robert Olshansky, filed Sept. 21, 1976, describe the use of gradient index perturbations to achieve mode coupling.

SUMMARY OF THE INVENTION

In accordance with this invention, a waveguide has cylindrical perturbations in the core which are spaced along the length of the core and which include index of refraction variations in rings within the core.

The waveguide of this invention is manufactured in a process in which the perturbations have controllable coupling properties. More particularly, the waveguides are manufactured by a process in which glass is built up on a cylindrical bait with slight variations in composition of the core of the optical waveguide.

The foregoing and other objects, features and advantages of the invention will be better understood from the following more detailed description and appended claims.

DESCRIPTION OF THE DRAWINGS

FIGS. 4A and 4B depict the propagation of two modes in the waveguide;

FIG. 4C depicts the beat wavelength between the modes;

FIG. 5 shows the mode distribution in a waveguide;

FIG. 6 depicts the process of making the waveguide;

DETAILED DESCRIPTION OF THE INVENTION

Figure 1:
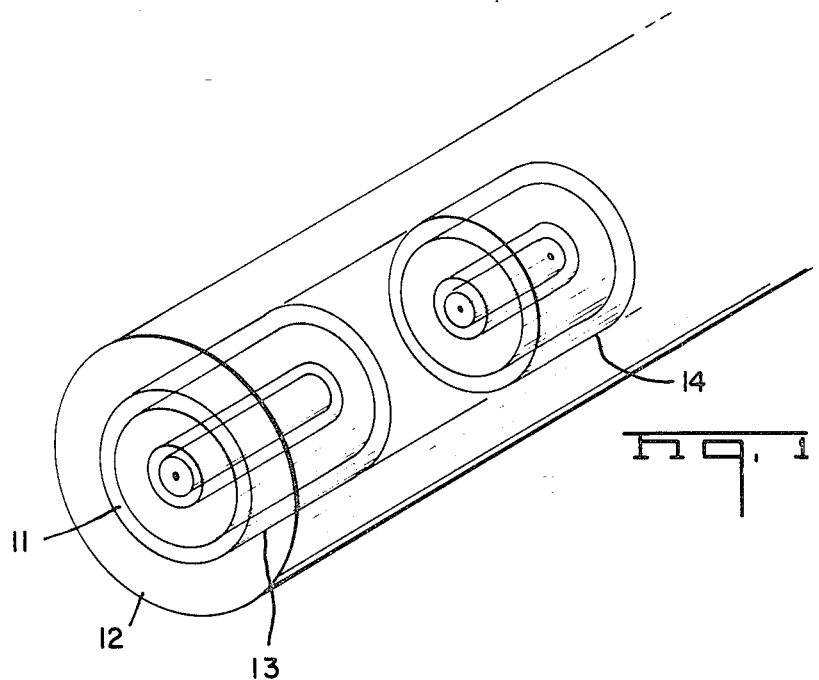
FIG. 1 depicts the waveguide of this invention.

The waveguide shown in FIG. 1 includes a glass core 11 and a glass cladding 12 around the core which has a higher index of refraction than the cladding.

Figure 2:
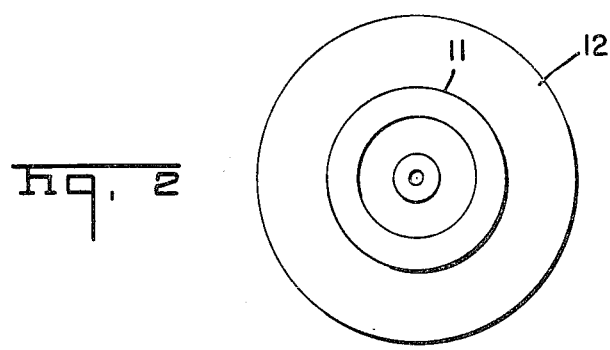
FIG. 2 is a cross section through one of the perturbations.
Figure 3:
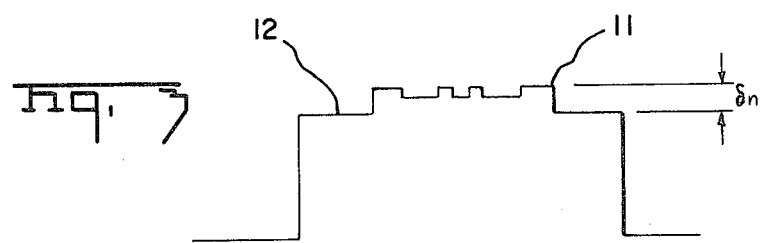
FIG. 3 depicts the refractive variation across the fiber.

In accordance with this invention, the waveguide includes perturbations 13, 14 and others which are spaced along the core. Each perturbation includes rings of index of refraction variations within the core. A cross section through the perturbation showing the rings of varying refraction in the core is shown in FIG. 2. FIG. 3 depicts the changes of index of refraction across the waveguide core for a step index guide but the preferred embodiment produced in accordance with the teachings of Carpenter U.S. Pat. No. 3,823,995, as subsequently described, will have a gradient index core.

As is well known, light travels along such an optical waveguide in different propagation modes, each having a different velocity associated therewith. In certain modes, the light is guided along the waveguide and in other modes, light is scattered. These are referred to as guided and unguided modes respectively.

FIG. 5 shows the distribution of modes in a waveguide as a function of phase constant $\beta$. The guided modes $M_1$-$M_7$ have phase constant $\beta_1$ through $\beta_7$ respectively. In addition, there is a continuance of unguided modes starting at phase constant $\beta_8$ which is indicated by the shaded area. As discussed in the aforementioned Miller et al patent, it is desirable to promote coupling between adjacent guided modes $M_1$-$M_7$ but to avoid power coupling to the unguided modes.

FIG. 4A and 4B depict waves of light in two different modes of propagation. FIG. 4C depicts the beat wavelength between the two modes. As discussed in the Marcatilli patent, the coupling at longitudinally spaced intervals along the guide has a spatial periodicity equal to the beat wavelength between the coupled modes.

As an example, in a fused silica waveguide having a diameter approximately 0.1 millimeters, the perturbations 13 and 14 have a length of approximately 1 millimeter to 1 centimeter, and the spacing between the perturbations is approximately 1 millimeter to 1 centimeter. The long interval variations in the core index of refraction in the perturbations determine the modes which will be coupled in the optical waveguide. The length and the spacing of the perturbations is selected to promote coupling between selected guided modes.

In FIG. 1, the refractive index change along the axis of the waveguide is illustrated for one set of cylindrical perturbations. The length of the cylindrical perturbations are given by x and their separation by d. It has been shown in the aforementioned Marcuse book that the maximum coupling occurs between two adjacent modes whose propagation constants obey the relation $$\beta_1 - \beta_2 = \theta$$

where $\theta$ is related to the refractive index changes by $$n(z) = A \sin \theta z$$

and $$\theta = 2\pi / x$$

Figure 8:
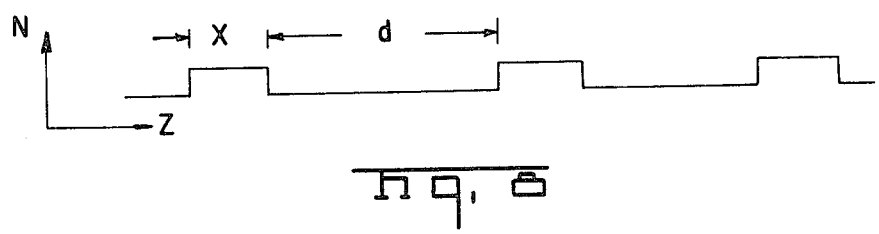
FIG. 8 shows the refractive index variation for a single set of rings.

The separation between two adjacent mode groups is given by $$\beta_1 - \beta_2 = \frac{1}{r} \left( \frac{2 \Delta n}{n} \right)^{\frac{1}{2}}$$

where r is the radius of the wave guide core, $\Delta n$ is the difference in refractive index between the core and cladding, and n is the average refractive index of the waveguide. These formulas allow the calculation of x. For a typical optical waveguide and a part of the modes, x is about 1-2 mm. However, for higher order modes, this approximate formula for $\beta_1 - \beta_2$ is less valid. The mode separation is smaller and x will be larger. The separation d can be chosen to provide the desired degree of coupling. FIG. 8 shows the refractive index variation for a single set of rings. Many concentric sets of rings can be utilized and it is not necessary that each set be positioned at the same point along the axial direction, z. Each set will most effectively couple those modes which have large electric field amplitudes at the radius of the ring.

Fabrication of the proper ring distance x can be accomplished by noting the relation between dimensions in the preform and dimensions in the fiber. Conservation of matter shows that $xr^2 = XR^2$ where capital letters designate the corresponding dimensions in the preform. Since R/r is typically $10^2$, the ring length in the preform is 0.1 to 10 $\mu$m for distances of 1 mm to 10 cm in the fiber.

Figure 7:
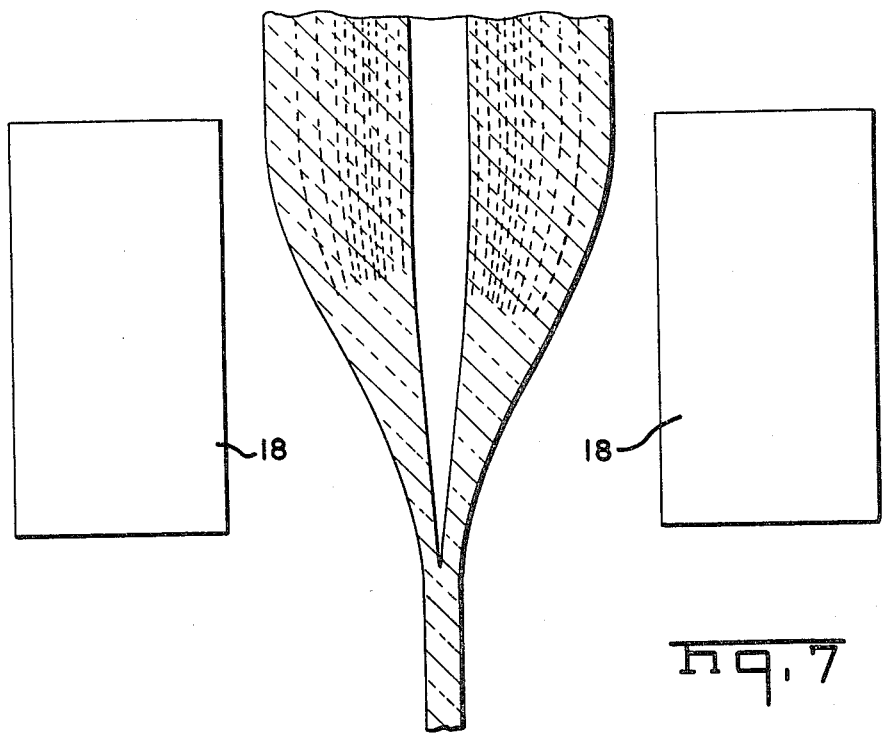
FIG. 7 depicts the step of drawing the waveguide.

FIGS. 6 and 7 depict the manner of fabricating the waveguide of this invention.

Referring to FIG. 6, a plurality of layers of glass are applied to a substantially cylindrical glass starting member 15 by flame hydrolysis burner 16. Member 15 has a smooth outside peripheral surface to which glass soot adheres. Fuel, gas and oxygen or air are supplied to burner 16 from a source not shown. This mixture is burned to produce a flame which is emitted from the burner. A gas vapor mixture is hydrolyzed within the flame to form glass soot 17 that moves from the flame in a stream which is directed toward starting member 15. The flame hydrolysis method is described in more detail in U.S. Pat. No. 3,823,995—Carpenter. Starting member 15 is supported and rotated for deposition of the soot. The first layer is applied to the starting member, the gas vapor mixture is changed for each successive layer so that each of the layers have a composition whereby the desired radially varying composition for the refractive index is obtained. Then the starting member 15 is translated longitudinally and a uniform layer is deposited to form the cladding. Perturbations in these layers are formed by translating a laser, or other device, along the axial direction of the rotating glass cylinder. At distances, D, the laser is stopped for a distance X. After translating a distance X along the axial direction, the laser again resumes operating. Within the distance D, the laser radiation alters the condition of the glass and generates the subsequent variation of refractive index. Alternately, if the laser has a resolution the order of X, it may be operated within the translation of X but not D. In either case, the distance X and not the distance D must be precisely controlled. The resultant member is drawn into a finished waveguide as depicted in FIG. 7. It is heated in the furnace 18 to drawing temperature and drawn down to a waveguide having the desired perturbation length and spacing.

While a particular embodiment of the invention has been shown and described, various modifications are within the true spirit and scope of the invention. The appended claims are intended to cover all such modifications.

What is claimed is:

1. The method of forming an optical waveguide capable of propagating light in multiple modes with power coupling between selected modes comprising:
   providing a solid substantially cylindrical starting member having a smooth outside peripheral surface;
   applying a plurality of distinct and successive layers of particular materials to said smooth outside peripheral surface of said solid cylindrical member, each such distinct layer having a substantially uniform composition therethrough, but having a progressively different composition from the preceeding layer so as to form a structure having a stepped radially varying composition, the composition of each said layer forming one of the steps;
   modifying the index of refraction of said composition along a plurality of axial distances, each of said axial distances being separated by sapces of composition having unmodified index of refraction;
   heating the structure so formed to the drawing temperature of the materials thereof; and, drawing the heated structure to reduce the cross-sectional area thereof and to form a waveguide having a plurality of cylindrical perturbations along the length thereof, said perturbations including index of refraction variations in concentric rings within said composition.

2. The method recited in claim 1 wherein the step of modifying is carried out by selectively heating the composition to lower the index of refraction thereof.

3. The method recited in claim 2 wherein the step of heating is carried out by producing relative longitudinal motion between said waveguide and a source of laser radiation; and turning said laser on and off to lower the index of refraction along axial distances, each being separated by unmodified composition in the spaces in which said laser is turned off.

* * * * *